(12) United States Patent
Jurng et al.

(10) Patent No.: US 7,157,069 B2
(45) Date of Patent: Jan. 2, 2007

(54) APPARATUSES AND PROCESSES FOR SYNTHESIS OF CARBON NANOTUBES USING INVERSE DIFFUSION FLAME

(75) Inventors: Jong-Soo Jurng, Seoul (KR); Gyo-Woo Lee, Seoul (KR); Jung-Ho Hwang, Seoul (KR); Sung-Min Chin, Seoul (KR); Sung-Jun Lee, Seoul (KR); Gwi-Nam Bae, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 639 days.

(21) Appl. No.: 10/340,527

(22) Filed: Jan. 9, 2003

(65) Prior Publication Data

US 2003/0133866 A1    Jul. 17, 2003

(30) Foreign Application Priority Data

Jan. 11, 2002    (KR) ...................... 10-2002-0001633

(51) Int. Cl.
*C01B 31/02*    (2006.01)
*F23D 14/22*    (2006.01)

(52) U.S. Cl. .................. 423/447.3; 977/842; 977/843; 431/2; 431/4; 431/8; 431/187

(58) Field of Classification Search ............ 423/447.3, 423/445 B; 431/4, 8, 350, 2, 187
See application file for complete search history.

(56) References Cited

U.S. PATENT DOCUMENTS

| | | | | |
|---|---|---|---|---|
| 5,222,447 A | * | 6/1993 | Joshi et al. ................. | 110/261 |
| 5,743,723 A | * | 4/1998 | Iatrides et al. ................. | 431/8 |
| 5,891,414 A | * | 4/1999 | Kanamaru et al. ........... | 423/455 |
| 5,985,232 A | * | 11/1999 | Howard et al. ........... | 423/447.3 |
| 6,206,685 B1 | * | 3/2001 | Zamansky et al. ............. | 431/4 |
| 6,208,234 B1 | * | 3/2001 | Hunt et al. ................. | 338/308 |
| 2003/0044342 A1 | * | 3/2003 | Alford et al. ........... | 423/445 R |

OTHER PUBLICATIONS

Hebgen et al. "Synthesis of Fullerenes and Fullerenic Nanostructures in a Low-Pressure Benzene/Oxygen Diffusion Flame", 2000, Proceedings of the Combustion Institute, vol. 28, pp. 1397-1404.*

* cited by examiner

*Primary Examiner*—Stuart L. Hendrickson
*Assistant Examiner*—Alvin T Raetzsch
(74) *Attorney, Agent, or Firm*—Jones Day

(57) ABSTRACT

Disclosed is an apparatus for the combustion synthesis of carbon nanotubes characterized with the combustor having an oxidizing agent inlet, a fuel inlet and an inert gas inlet, such that the inverse diffusion flame occurs within the combustor, thereby producing carbon nanotubes without using vacuum, and a method for the combustion synthesis of carbon nanotubes using the same. According to the present invention, it is possible to directly collect samples including carbon nanotubes without oxidation and a substrate may be installed with ease. Moreover, the manufacturing cost can be lowered to a level suitable for mass production so that the carbon nanotube technology can be extended to various applications.

5 Claims, 1 Drawing Sheet

APPARATUSES AND PROCESSES FOR SYNTHESIS OF CARBON NANOTUBES USING INVERSE DIFFUSION FLAME

FIELD OF THE INVENTION

The present invention relates to apparatuses and processes for synthesis of carbon nanotubes using an inverse diffusion flame. More particularly, the present invention relates to apparatuses and processes for combustion synthesis of carbon nanotubes using an inverse diffusion flame such that the combustion synthesis of carbon nanotubes is carried out without using vacuum by allowing an oxidizing agent, a fuel and an inert gas to form the inverse diffusion flame in a combustor.

BACKGROUND OF THE INVENTION

The arc discharge was the first available method for the production of both multiwall nanotubes (MWNTs) and single wall nanotubes (SWNTs). This technique has been in use for a long time for the production of carbon fibers and it is probable that nanotubes were observed before 1991 but not recognized. An arc is struck between two graphite electrodes in a gas atmosphere. MWNTs produced by arc discharge are long and straight tubes closed at both ends with graphitic walls running parallel to the tube axis. Iijima et al. ("Single-Shell Carbon Nanotubes of 1-nm Diameter", Nature 363:603–605, June 1993) and Bethune et al. ("Cobalt-Catalysed Growth of Carbon Nanotubes with Single-Atomic-Layer Walls," Nature, 363:605–607, June 1993) reported that an arc discharge with a cathode containing metal catalysts (such as cobalt, iron or nickel) mixed to graphite powder results in a deposit containing SWNTs. SWNTs are usually assembled in ropes but some single tubes can also be found in the deposits. Another method to grow SWNTs using laser ablation was demonstrated in 1996 by Smalley's group and has prompted a lot of interest. Specifically, Thess et al. showed that the synthesis could be carried out in a horizontal flow tube under a flow of inert gas at controlled pressure ["Crystalline Ropes of Metallic Carbon Nanotubes," Science, 273, 483–487 (1996)]. In this set-up the flow tube is heated to ~1200° C. by a tube furnace. Laser pulses enter the tube and strike a target consisting of a mixture of graphite and a metal catalyst such as Co or Ni. SWNTs condense from the laser vaporization plume and are deposited on a collector outside the furnace zone. These methods of the first generation have some disadvantages as they require complicated purifying processes after their synthesis to make high purity carbon nanotubes, and it is also difficult to control the structure of the carbon nanotubes and to perform a vertical alignment of the tubes.

In the second-generation methods, there has been developed the gas phase combustion synthesis for the purpose of mass production of carbon nanotubes. Recently, active researches have been carried out on methods capable of the synthesis of carbon nanotubes with vertical alignment, e.g., chemical vapor deposition ("CVD"), plasma enhanced ("PE") CVD, radio frequency ("RF") plasma CVD, microwave PE CVD and thermal CVD. It has been possible to perform the synthesis in low temperature, high purity synthesis, and the synthesis on large area substrate as well as the vertical alignment synthesis of carbon nanotubes by second generation methods (see, Korean Patent Laid-open No. 2001-49668). However, the second-generation methods are the batch-type processes, which require vacuum, and thus, the manufacturing cost of carbon nanotubes is extremely high.

Recently, some researchers have tried to synthesize carbon nanotubes using flame instead of the second-generation methods as described above. The flame is in the form of a diffusion flame wherein the oxidizing agent surrounds the fuel. The problem which exists is that in the case of using a conventional method for combustion synthesis of carbon nanotubes, it is impossible to directly collect samples of the carbon nanotubes produced in the flame zone or to install a substrate over the flame zone wherein oxidation may not be occur.

SUMMARY OF THE INVENTION

Therefore, the object of the present invention is to overcome such limitations in conventional methods and to provide apparatuses and processes for the combustion synthesis of carbon nanotubes using an inverse diffusion flame such that the combustion synthesis of carbon nanotubes is carried out without using vacuum by allowing an oxidizing agent, a fuel and an inert gas to form the inverse diffusion flame in a combustor.

The apparatus for the combustion synthesis of carbon nanotubes of the present invention is characterized in that the combustor comprises an oxidizing agent inlet for supplying an oxidizing agent into the combustor; a fuel inlet for supplying a fuel into the combustor, which is installed to block the connection of the oxidizing agent with the outside by allowing the supplied fuel to surround the oxidizing agent; and an inert gas inlet for supplying an inert gas into the combustor, which is installed to block the connection of the fuel with the surrounding air by allowing the supplied inert gas to surround the fuel; wherein the combustion synthesis of carbon nanotubes is performed with an inverse diffusion flame within the combustor without using vacuum, wherein the fuel surrounds the oxidizing agent and the inert gas surrounds the fuel so as to isolate the fuel from the surrounding air, and the inverse diffusion flame occurs from the inside of the flame in the following order, the oxidizing agent, the fuel and the inert gas.

In a method for the combustion synthesis of carbon nanotubes according to the present invention, the carbon nanotubes can be produced by inverse diffusion flame within the combustor without using vacuum in such a way that fuel surrounds the oxidizing agent and the inert gas surrounds the fuel to isolate the fuel from surrounding air, and the inverse diffusion flame occurs from the inside of the flame in the order of the oxidizing agent, the fuel and the inert gas by supplying the oxidizing agent, the fuel and the inert gas into the combustor, respectively.

BRIEF DESCRIPTION OF DRAWING

The above and other objects and features of the present invention will become apparent from the following description of the preferred embodiments given in conjunction with the accompanying drawing.

DETAILED DESCRIPTION OF THE PRESENT INVENTION

Figure 1:
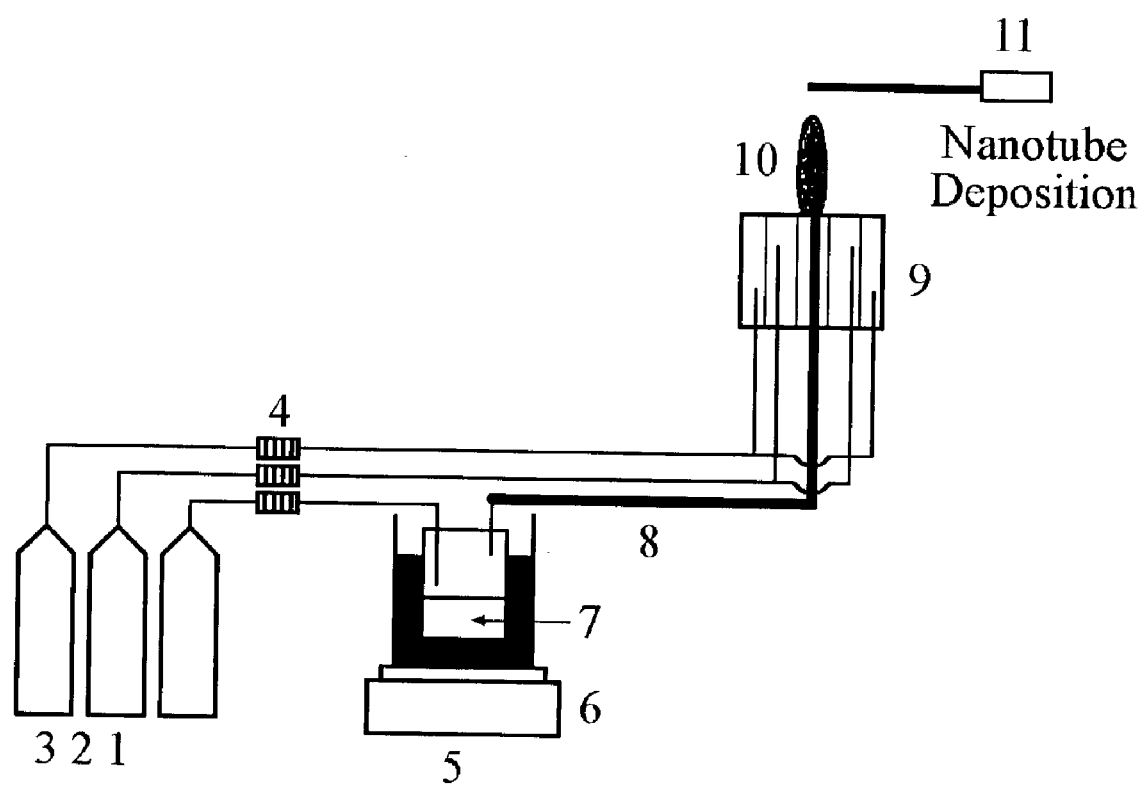
FIG. 1 illustrates an example of an apparatus for the synthesis of carbon nanotubes using inverse diffusion flame in accordance with the present invention.

The present invention is an apparatus for the combustion synthesis of carbon nanotubes wherein the combustor has an oxidizing agent inlet, a fuel inlet and an inert gas inlet such that an inverse diffusion flame occurs in the combustor, thereby producing carbon nanotubes without using vacuum. The invention also covers a method for the combustion synthesis of carbon nanotubes using the same.

The present apparatus for combustion synthesis of carbon nanotubes has a combustor, which has an oxidizing agent inlet for supplying an oxidizing agent into the combustor. The combustor also has a fuel inlet for supplying fuel, which is installed to block the connection of the oxidizing agent with the outside environment by allowing the fuel to surround the oxidizing agent. Additionally, an inert gas inlet for supplying inert gas into the combustor is provided, which is installed to block the connection of the fuel with the surrounding air by allowing the supplied inert gas to surround the fuel. The combustion synthesis of carbon nanotubes is performed without using vacuum by having the inverse diffusion flame within the combustor in such a way that the fuel surrounds the oxidizing agent and the inert gas surrounds the fuel, which isolates the fuel from the surrounding air. The inverse diffusion flame occurs from the inside of the flame in the following order, the oxidizing agent, the fuel and the inert gas.

According to the one embodiment of the present invention, the apparatus further comprises a transition metal solution evaporator at a pathway for supplying the oxidizing agent into the combustor so that an oxidizing agent containing a transition metal catalyst, which is essential for the growth of carbon nanotubes, is supplied to the combustor by passing the oxidizing agent through the metal evaporator.

The present invention is also directed to a method for the combustion synthesis of carbon nanotubes. This method allows production of carbon nanotubes without using vacuum by occurrence of inverse diffusion flame within the combustor in such a way that fuel surrounds the oxidizing agent and the inert gas surrounds the fuel to isolate the fuel from surrounding air and the inverse diffusion flame occurs from the inside of the flame in the order of the oxidizing agent, the fuel and the inert gas by supplying the oxidizing agent, the fuel and the inert gas into the combustor, respectively.

Unlike a diffusion flame in which the oxidizing agent surrounds the fuel, the "inverse diffusion flame" as used herein is an opposite type of the diffusion flame in which the fuel surrounds the oxidizing agent and the fuel is surrounded by an inert gas in order to isolate the fuel from its surrounding air. In such an inverse diffusion flame, there is no oxidizing agent outside the flame. Thus, the inverse diffusion flame is very advantageous in growing the carbon nanotubes from the supplied fuel together with the transition metals at an appropriate high temperature, compared to conventional diffusion flames.

A conventional oxidizing agent, fuel and inert gas may be used in the combustion synthesis of carbon nanotubes of the present invention. More specifically, the oxidizing agent may be the gas containing oxygen, for instance, air and oxygen; the fuel may be a hydrocarbon fuel, such as methane, ethylene, acetylene, propane and propylene; and the inert gas may be nitrogen ($N_2$) and argon (Ar).

Further, according to the present invention, a transition metal catalyst may be supplied together with the oxidizing agent, or may be used in the form of a metal substrate, on which the carbon nanotubes grow. If the transition metal catalyst is supplied together with the oxidizing agent into the combustor, the oxidizing agent is passed through a transition metal solution evaporator before the oxidizing agent is supplied into the combustor. A transition metal catalyst that can be used in the present invention may include nickel (Ni) and iron (Fe).

The combustion synthesis of carbon nanotubes requires carbon-containing fuels, combustion temperature, residence time and the ambient circumstances that prohibit oxidation, which depends on the type of fuel, an apparatus for synthesis and the like.

Where a conventional method for combustion synthesis of carbon nanotubes is employed using conventional diffusion flames wherein the oxidizing agent, e.g., air surrounds the fuel, it is impossible to directly collect samples including the carbon nanotubes produced within the flame zone without oxidation, or to install a substrate over the flame zone. The present invention, however, employs the inverse diffusion flame wherein the fuel surrounds the oxidizing agent and the inert gas surrounds the fuel so as to isolate the fuel from the outside as described above. Therefore, it is possible to control the temperature of the forming zone of carbon nanotubes, depending on the distance from the flame, that is, the spatial location outside the flame zone. And, there exists no oxygen outside the flame zone, and carbon source for growing carbon nanotubes can be continuously supplied from the fuel. Consequently, according to the present invention, it is possible to perform the combustion synthesis of carbon nanotubes in a continuous mode as well as in a batch mode.

According to the present invention, the transition metal catalyst may be supplied together with the oxidizing agent, or may be used in the form of a metal plate. Thus, the transition metal is sent inside the flame zone to grow the carbon nanotubes at an appropriate height on the substrate or the carbon nanotubes can grow directly on the transition metal plate.

Hereinafter, a more detailed description of the present invention is provided with reference to the drawing.

FIG. 1 illustrates an example of the apparatus for the combustion synthesis of carbon nanotubes using the inverse diffusion flame according to the present invention. Referring to FIG. 1, fuel 2 and inert gas 3 are supplied individually to a combustor 9 through the respective MFC (mass flow controller) 4. Oxidizing agent 1 passes through its MFC 4 and a transition metal used as a catalyst is thereby included. The catalyst is made by heating metal nitride 7 by passing it over a hot plate 6 in a metal evaporator 5. The oxidizing agent 1 including such transition metal is supplied to the combustor 9 while also being heated by a heating line 8. The oxidizing agent 1, fuel 2 and inert gas 3 are arranged to form inverse diffusion flame 10 in the indicated order from the inside of the flame, wherein the fuel 2 surrounds the oxidizing agent 1 and the inert gas 3 surrounds the fuel 2 thereby isolating the fuel from the outside. Thus, carbon nanotubes grow on a target substrate 11 outside the flame due to the inverse diffusion flame.

In another embodiment of the present invention, instead of using the metal evaporator 5, carbon nanotubes may grow on a substrate containing the transition metal as a catalyst.

The preferred embodiment of the present invention will now be described. As with other examples, this embodiment is intended to illustrate an example of the present invention, and to not limit the present invention thereto.

EXAMPLE 1

In the apparatus for the combustion synthesis of carbon nanotubes of FIG. 1, methane and nitrogen gas were supplied separately to the combustor at the rate of 4 cm/s (15 L/min) and 150 cm/s (40 L/min) respectively by using the respective MFCs. Air was supplied at a rate of 20 cm/s (1 L/min) by using its MFC and was passed through Ni nitride that was heated up to 160° C. by a hot plate in a metal evaporator, to incorporate Ni therein. Thereafter, this air containing Ni was kept at 160° C. by a heating line and supplied to a combustor. Air containing Ni, methane and nitrogen gas supplied to the combustor were arranged to form an inverse diffusion flame in the described order from the inside of the flame. The carbon nanotubes were allowed to grow on a substrate outside of the flame at high temperature, with the fuel existing only outside the flame zone.

According to the present invention, the combustion synthesis of carbon nanotubes can be performed without using vacuum by allowing the oxidizing agent, fuel and inert gas to form the inverse diffusion flame within a combustor. As the fuel exists outside the flame zone, it is possible to directly collect samples of carbon nanotubes and a substrate may be installed with ease. Moreover, the manufacturing costs can be significantly lowered to a level suitable for mass production so that carbon nanotube technology can be extended to various applications.

What is claimed is:

1. A method for the combustion synthesis of carbon nanotubes using a combustor, wherein the carbon nanotubes are produced by an inverse diffusion flame within the combustor without using a vacuum, wherein an oxidizing agent, a fuel and an inert gas are supplied into the combustor in such a way that the fuel surrounds the oxidizing agent and the inert gas surrounds the fuel so as to isolate the fuel from the surrounding air, wherein the inverse diffusion flame occurs from the inside of the flame in the order of the oxidizing agent, the fuel and the inert gas, and wherein the carbon nanotubes produced by the inverse diffusion flame are collected.

2. The method of claim 1, wherein the oxidizing agent is air or oxygen; the fuel is selected from a group consisting of methane, ethylene, acetylene, propane and propylene; and the inert gas is nitrogen ($N_2$) or argon gas (Ar).

3. The method of claim 1, wherein before the oxidizing agent is supplied to the combustor, the oxidizing agent is passed through a transition metal solution evaporator so that a transition metal catalyst is supplied into the combustor together with the oxidizing agent.

4. The method of claim 1, wherein a substrate including a transition metal is used.

5. The method of claim 1, wherein the combustion synthesis of carbon nanotubes is performed in a continuous mode.

* * * * *